(12) United States Patent
Dix

(10) Patent No.: US 10,709,106 B2
(45) Date of Patent: Jul. 14, 2020

(54) PET VESTIBULE

(71) Applicant: Christopher J. Dix, Villa Ridge, MO (US)

(72) Inventor: Christopher J. Dix, Villa Ridge, MO (US)

(*) Notice: Subject to any disclaimer, the term of this patent is extended or adjusted under 35 U.S.C. 154(b) by 567 days.

(21) Appl. No.: 15/350,857

(22) Filed: Nov. 14, 2016

(65) Prior Publication Data

US 2017/0188542 A1    Jul. 6, 2017

Related U.S. Application Data

(60) Provisional application No. 62/273,714, filed on Dec. 31, 2015.

(51) Int. Cl.
| | | |
|---|---|---|
| *A01K 1/035* | (2006.01) |
| *A01K 1/03* | (2006.01) |
| *E06B 7/32* | (2006.01) |
| *E06B 7/34* | (2006.01) |

(52) U.S. Cl.
CPC ............ *A01K 1/035* (2013.01); *E06B 7/32* (2013.01); *E06B 7/34* (2013.01)

(58) Field of Classification Search
CPC ........ A01K 1/033; A01K 1/034; A01K 1/035; A01K 1/03; A01K 1/02; E06B 7/32; E06B 7/34
See application file for complete search history.

(56) References Cited

U.S. PATENT DOCUMENTS

| | | | | | |
|---|---|---|---|---|---|
| 3,587,528 | A | * | 6/1971 | Lake | A01K 1/02 |
| | | | | | 119/499 |
| 4,021,975 | A | * | 5/1977 | Calkins | A01K 1/033 |
| | | | | | 119/165 |
| 4,224,899 | A | * | 9/1980 | Cruchelow | A01K 1/035 |
| | | | | | 119/501 |
| 4,291,645 | A | * | 9/1981 | Cruchelow | A01K 1/033 |
| | | | | | 119/484 |
| 4,788,934 | A | * | 12/1988 | Fetter | A01K 1/033 |
| | | | | | 119/484 |
| 5,134,973 | A | * | 8/1992 | Sarullo | A01K 1/033 |
| | | | | | 119/165 |
| 5,148,767 | A | * | 9/1992 | Torchio | A01K 1/033 |
| | | | | | 119/484 |
| 5,165,366 | A | * | 11/1992 | Harvey | A01K 1/0107 |
| | | | | | 119/165 |
| 5,649,500 | A | * | 7/1997 | Klavemann | A01K 1/035 |
| | | | | | 119/452 |

(Continued)

FOREIGN PATENT DOCUMENTS

EP    750840 A1 *  1/1997  ............ A01K 1/03

OTHER PUBLICATIONS

Machine translation of EP 750840 to Cahuzac et al., published Jan. 1997.*

(Continued)

*Primary Examiner* — Kathleen I Alker
(74) *Attorney, Agent, or Firm* — Lewis Rice LLC

(57) ABSTRACT

A pet vestibule configured for being attached to a door and to swing open with the door. Vestibule provides a protected shelter area for pets and animals to come and go into a structure without the need for human assistance, while also inhibiting rain, snow, and other inclement weather from entering the structure through the pet door.

10 Claims, 6 Drawing Sheets

(56) References Cited

U.S. PATENT DOCUMENTS

| | | | | |
|---|---|---|---|---|
| 5,970,914 A * | 10/1999 | Steil | A01K 1/0107 | 119/165 |
| 5,975,017 A * | 11/1999 | Cameron | A01K 1/033 | 119/165 |
| 6,029,609 A * | 2/2000 | Bahar | A01K 1/033 | 119/474 |
| 6,234,116 B1 * | 5/2001 | Havener | A01K 1/033 | 119/452 |
| 6,394,035 B1 * | 5/2002 | Hill | A01K 1/035 | 119/482 |
| 6,668,487 B2 * | 12/2003 | Vesey | E06B 7/32 | 119/501 |
| 6,722,315 B2 * | 4/2004 | Sinor | A01K 1/035 | 119/474 |
| 6,912,974 B2 * | 7/2005 | Ozeri | A01K 1/033 | 119/484 |
| 7,178,482 B1 * | 2/2007 | Derrick | A01K 1/033 | 119/474 |
| 7,530,331 B1 * | 5/2009 | Malachowski | A01K 1/0107 | 119/484 |
| 7,640,890 B1 * | 1/2010 | Maynard | A01K 1/035 | 119/484 |
| 9,339,006 B1 * | 5/2016 | Eby | A01K 1/034 | |
| 9,961,875 B2 * | 5/2018 | Goddard Imel | A01K 1/0107 | |
| 2007/0062651 A1 * | 3/2007 | Lippard | A01K 1/0005 | 160/135 |
| 2007/0157889 A1 * | 7/2007 | McDonough | A01K 1/033 | 119/484 |
| 2007/0186866 A1 * | 8/2007 | Shibles | A01K 1/033 | 119/484 |
| 2010/0175631 A1 * | 7/2010 | Bennatt | A01K 1/033 | 119/472 |
| 2011/0146583 A1 * | 6/2011 | Larson | A01K 1/033 | 119/455 |
| 2011/0226189 A1 * | 9/2011 | Dani Piliero | A01K 1/035 | 119/474 |
| 2012/0318206 A1 * | 12/2012 | van Leeuwen | A01K 1/035 | 119/416 |
| 2014/0230746 A1 * | 8/2014 | Chapman | A01K 1/0254 | 119/453 |
| 2014/0305378 A1 * | 10/2014 | Lever | A01K 1/03 | 119/417 |
| 2015/0216139 A1 * | 8/2015 | Drake | A01K 1/034 | 119/480 |
| 2017/0027131 A1 * | 2/2017 | Brownridge | G07F 17/0021 | |

OTHER PUBLICATIONS

Hale Pet Door—Slant Roof Security Barrier, https://www.halepetdoor.com/products/59-slant-roof-security-barrier, published Nov. 2014.*

* cited by examiner

PET VESTIBULE

CROSS REFERENCE TO RELATED APPLICATIONS

This application claims benefit of U.S. Provisional Patent Application No. 62/273,714, filed Dec. 31, 2015, the entire disclosure of which is incorporated herein by reference.

BACKGROUND

1. Field of the Invention

This disclosure relates to animal management, and more particularly to a vestibule or staging area for transitioning animals from outdoors to indoors.

2. Description of the Related Art

Many families want their household pets to live indoors with the family. This provides the animal with socialization opportunities, warmth, security, and clean food and water. However, many household pets still have a need to go outdoors, such as for play or elimination. The family can either let the animal out and back in on demand, or install devices that allow the animal to come and go as it pleases.

Letting the animal out and in on demand has advantages, such as controlling when the animal comes back in, and thus providing an opportunity for reducing mud and other materials from being tracked in from outdoors by cleaning the animal when it comes in. However, the family cannot let the animal out and in when not at home, and the animal may need to go outside, such as for elimination, when nobody is available to let it out. Some families solve this through crate training, but not all animals tolerate crate training and not all families are willing to crate their pets.

An alternative commonly used is a "pet door" or "doggy door." which is typically a hole cut in an exterior door with a heavy flap covering it. The hole is large enough for the animal to pass through by nosing the flap aside and hoping through, but usually too small for a human intruder. Pet doors allow the animal to come and go as it pleases, but also have disadvantages, such as not being able to clean off the animal before it comes in. This is often addressed by having the doggy door lead to a portion of the home's interior that is isolated from the rest of the home, where the animal can run free but contain the mess. Examples include kennels built into garages and mud rooms.

However, another flaw with pet doors is that, during inclement weather, wind and rain can blow through the door. Since pet doors often lead to isolated areas of the home, this can cause water build up, and may chill the animal or damage the interior of the home. What is needed is an apparatus that preserves the come-and-go flexibility of a doggy door but provides a buffer between the interior and exterior environment.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a pet vestibule configured for disposing adjacent to a door, and having ingress/egress means disposed so as to inhibit exterior elements from passing through the door.

A pet vestibule comprising: an open side configured to attach to a residential house door having a pet door therein such that the perimeter of the open side is generally flush to the exterior door and the perimeter surrounds the pet door; a wall side opposing the open side and generally parallel thereto; a vestibule door side extending from the open side to the wall side, the vestibule door side comprising a wall with an opening therein configured to accommodate the passage of an animal and forming a vestibule pet door; a second wall side opposing the door side and extending from the open side to the wall side; and a top side connected to the open side, the wall side, the door side, and the second wall side; wherein the open side, the wall side, the door side, the second wall side, and the top are attached in the configuration of a right trapezoidal prism.

In an embodiment, the top is translucent.

In another embodiment, the top is transparent.

In a further embodiment, when the vestibule is installed on a residential door, the top side slopes downwardly away from the residential door.

In a still further embodiment, the top extends outwardly from the door side, the wall side, and second wall side.

In a still further embodiment, the top is hingedly attached to the vestibule.

In a still further embodiment, a flap is hingedly disposed in the vestibule pet door.

In a still further embodiment, the vestibule further comprises a scaling means for inhibiting rain runoff from a door from entering the vestibule.

In a still further embodiment, the sealing means is selected from the group consisting of: a gasket and a door sweep.

In a still further embodiment, the vestibule further comprises one or more wheels attached to the vestibule.

In a still further embodiment, the vestibule further comprises a bottom floor side opposing the top side.

In a still further embodiment, the vestibule further comprises an interior electrical light.

In a still further embodiment, the vestibule further comprises an interior warming element.

In a still further embodiment, the vestibule further comprises one or more height-adjustable leg assemblies.

Also described herein, among other things, is a pet vestibule installation system for installing a temporary pet vestibule to the outside of an exterior residential door having a pet door therein, comprising: a pet vestibule having an open side defined by a perimeter frame having a vestibule flange element attached thereto; a frame mountable to the residential door and having a flange portion sized and shaped to accept the vestibule flange element; wherein when the pet vestibule is installed on the residential door via the pet vestibule installation system, the pet door is surrounded by the perimeter frame.

In an embodiment, the vestibule flange element is generally in the configuration of a U-shape, and the frame flange portion is generally in the configuration of a U-shape.

In an embodiment, the frame is mountable to the residential door via one or more holes in the frame configured to accept mounting hardware.

Also described herein, among other things, is a method for installing a pet vestibule installation on a door comprising: providing a door having a pet door therein; providing a pet vestibule having an open side defined by a perimeter frame having a vestibule flange element attached thereto;

providing a mounting frame having a flange portion sized and shaped to accept the vestibule flange element; affixing the mounting frame to the door to define a space between the flange portion and the door, inserting the vestibule flange element into the defined space.

In an embodiment, the vestibule flange element is generally in the configuration of a U-shape, and the mounting frame flange portion is generally in the configuration of a U-shape.

In an embodiment, the mounting frame is affixed to the door by affixing mounting hardware to the door through holes in the mounting frame.

BRIEF DESCRIPTION OF THE DRAWINGS

FIG. 5 depicts an isometric view of an embodiment of a temporary mounting system for a pet vestibule according to the present disclosure.

DESCRIPTION OF THE PREFERRED EMBODIMENTS

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 1:
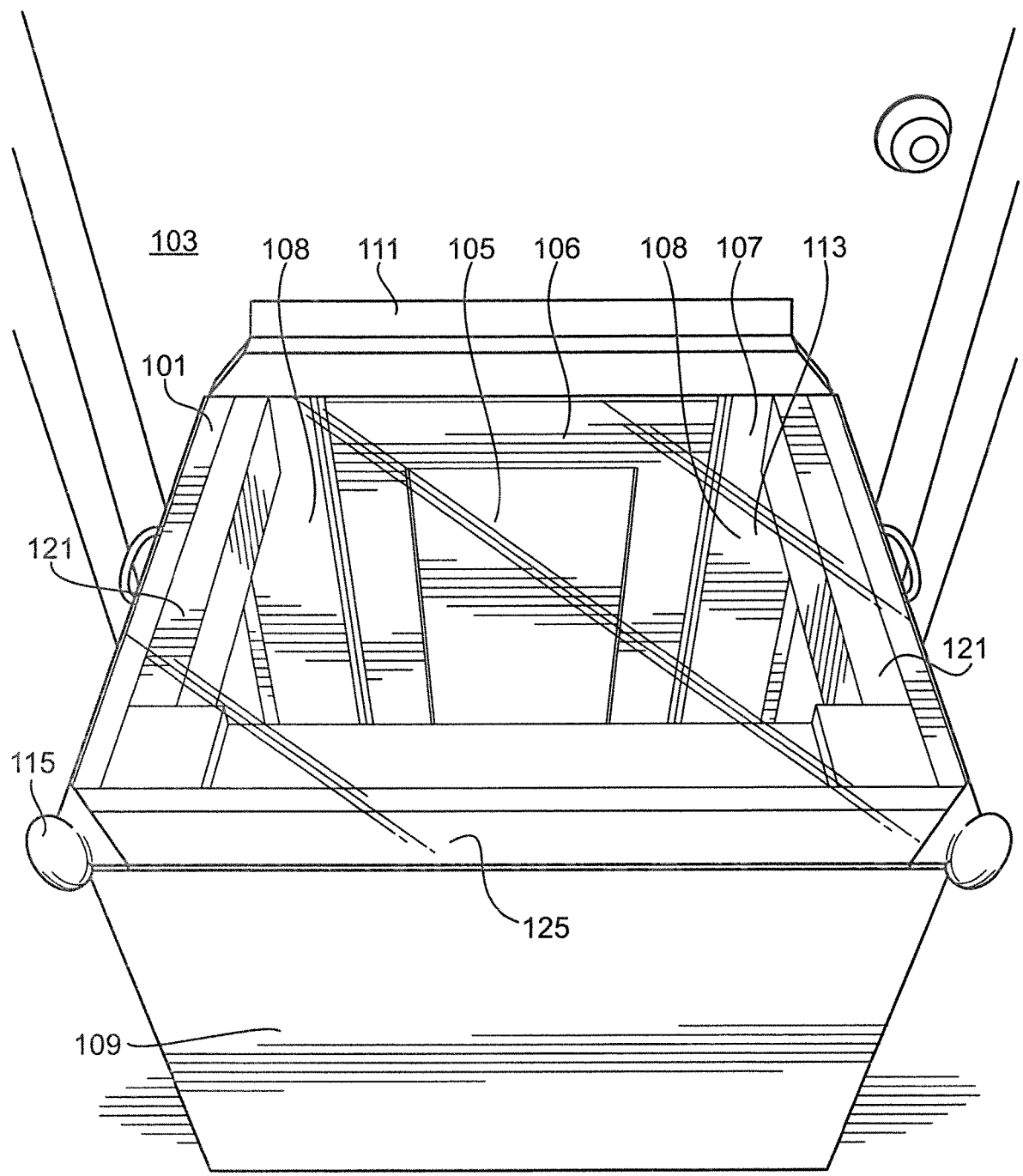
FIG. 1 depicts a top perspective view of an embodiment of a pet vestibule.

FIG. 1 depicts an embodiment of such a vestibule. In the depicted embodiment, a vestibule (101) is disposed adjacent to a conventional door (103) for human passage to and from a structure. The depicted door (103) is an exterior door (103) but the device (101) described herein is suitable for use with interior doors as well. The door (103) includes a pet door or "doggy door" (105) comprising a hole through the door (103) fully or partially covered by a movable flap. The flap typically is attached to the top of the hole and hangs down so that an animal may easily move it aside, and the pull of gravity will cause the flap to move back to a resting position that generally covers the hole once the animal has passed.

Figure 2:
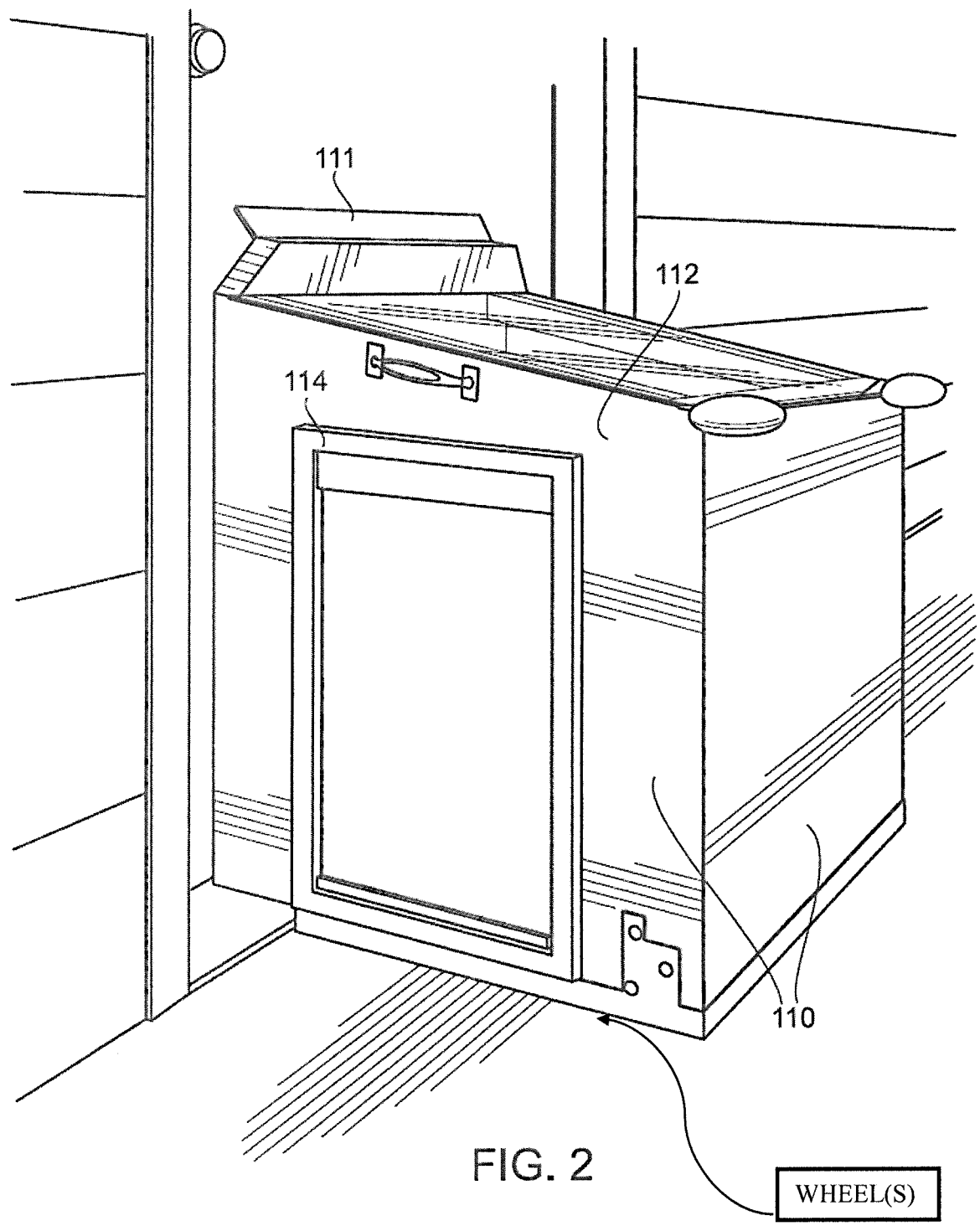
FIG. 2 depicts a side view of the embodiment of FIG. 1.
Figure 4:
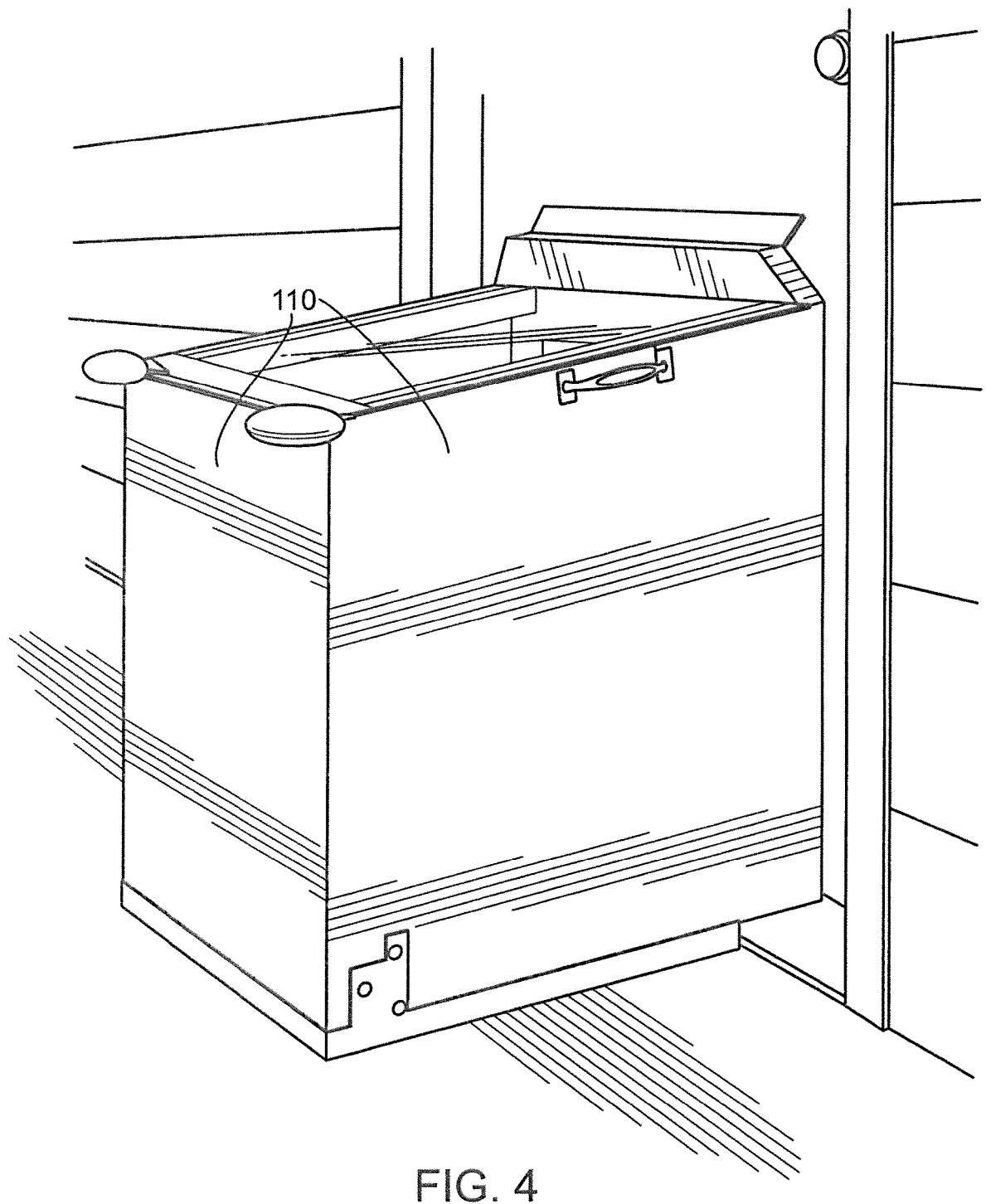
FIG. 4 depicts the alternate side view of the embodiment of FIG. 1.

The depicted vestibule (101) generally is in the configuration of a rectangular prism having a sloped top (113), forming a right trapezoidal prism in which the top (113) is the primary angle component and the other sides are generally orthogonal. See FIGS. 2 and 4. The slope provides for runoff of precipitation and is generally angled such that when the vestibule (101) is disposed against a door (103), runoff is directed away from the door (103). The depicted top (113) is made from a flexible transparent material, such as a transparent hard plastic. The transparency provides for natural lighting within the vestibule (101), which may help animals see when in the vestibule (101), reducing skittishness, and also allows for humans outside to quickly inspect the interior of the vestibule (101) for the presence of an animal without having to get down on hands and knees to peek inside. By using a hard plastic instead of glass, manufacturing cost is decreased and there is reduced risk of the top (113) shattering if the vestibule (101) is hit, such as by objects blown by the wind or thrown by a mower.

The depicted top (113) further comprises bumpers (115) on the corners, which soften edges to reduce injury to humans or animals, or damage to other objects, if the device (101) is struck. The top (113) may in certain embodiments be hingedly attached to the vestibule (101), or may be removable therefrom, which aids in the ease of cleaning and replacement. It is generally preferred that the connection between the top (113) and the frame (121) of the vestibule (101) be airtight and/or watertight, or nearly so, to further reduce intrusion of exterior elements. Also, in the depicted embodiment, the top (113) is larger than the frame (121), causing a portion of the top (113) to overhang past the frame (121) on at least one side. In the depicted embodiment, this overhang (125) is on the lowest end of the top (113), causing runoff drip on the ground, and not onto the frame (121). This also reduces leakage into the unit (101) from surface tension, which may cause liquid to cling to the underside of the top (113).

In the depicted embodiment of FIG. 1, the top (113) overhangs (125) primarily on one side, but in alternative embodiments, the top (113) may overhang on 2, 3, 4, or more sides, depending on the specific geometry of the vestibule (101). In the depicted embodiment, the top (113) is made of Plexiglass®. It should be noted that while a transparent and/or translucent top (113) is depicted, the top (113) may be opaque in other embodiments, and may be covered by further weatherproofing elements such as shingles.

The main body (109) of the vestibule (101) is essentially a three-sided box (109) having a fourth, open side (107). The open side (107) is configured for being disposed against the door (103) such that the open side (107) partially or fully covers the pet door (105), allowing an animal to pass through the pet door (105) and into the vestibule (101) or vice versa. The open side (107) may be partially closed, such as with framing elements, which are configured to cooperate with the pet door (105). For example, in the depicted embodiment of FIG. 1, the pet door (105) comprises a decorative frame (106), and the open side (107) comprises framing elements (108) disposed to surround the decorative framing (106) of the pet door (105) when the door (103) is closed and the vestibule (101) is disposed against the door (103). This creates a tighter fit between the vestibule (101) and door (103), inhibiting exterior elements from entering the home through the pet door (105), and inhibiting exterior elements from entering the vestibule (101) in any gap between the door (103) and vestibule (101).

The other three sides (110) are generally enclosed, with one (112) of the three enclosed sides (110) having disposed thereon a vestibule pet door (114). The depicted vestibule pet door is, like the pet door (105) in the conventional door (103), essentially a hole in the side of the vestibule (101)

fully or partially covered by a movable flap. The flap is preferably attached at the top of the hole so that after the animal passes, gravity will cause the flap to come to rest in a position fully or mostly covering the hole. The side (112) on which the vestibule pet door (114) is disposed is preferably not the side opposing the open end (107), but rather one of the sides (110) disposed orthogonally or diagonally therefrom. The reason for this is that if the two pet doors (105) and (114) are disposed in a straight line, wind and rain can more easily penetrate the interior of the home through the vestibule (101). However, by disposing the vestibule pet door (114) off to the side, a straight line wind may push aside the flap and blow into the vestibule (101), and rain may enter, but both are less likely to be at the proper angle to also penetrate the pet door (105) and get into the home. Preferably, the vestibule pet door (114) is also on a side of the vestibule (101) away from the direction of the prevailing winds (typically west-to-east), further reducing wind intrusion.

In the depicted embodiment, the top end of the open side (107) comprises a sealing means (111), such as a rubber gasket or door sweep (111) which may be disposed on the device (101) so that when the door (103) is closed, the sealing means (111) inhibits runoff from the door (103) from flowing into the vestibule (101). For example, a door sweep (111) may be disposed inverted to catch runoff and direct it to the top (113), where it can then flow to the far, low end of the top (113) and drip onto the ground. Other sealing means may also, or alternatively, be employed, such as foams or caulk. However, non-permanent sealants are preferred so that the door (103) may continue to be operated to allow human ingress/egress.

Figure 3:
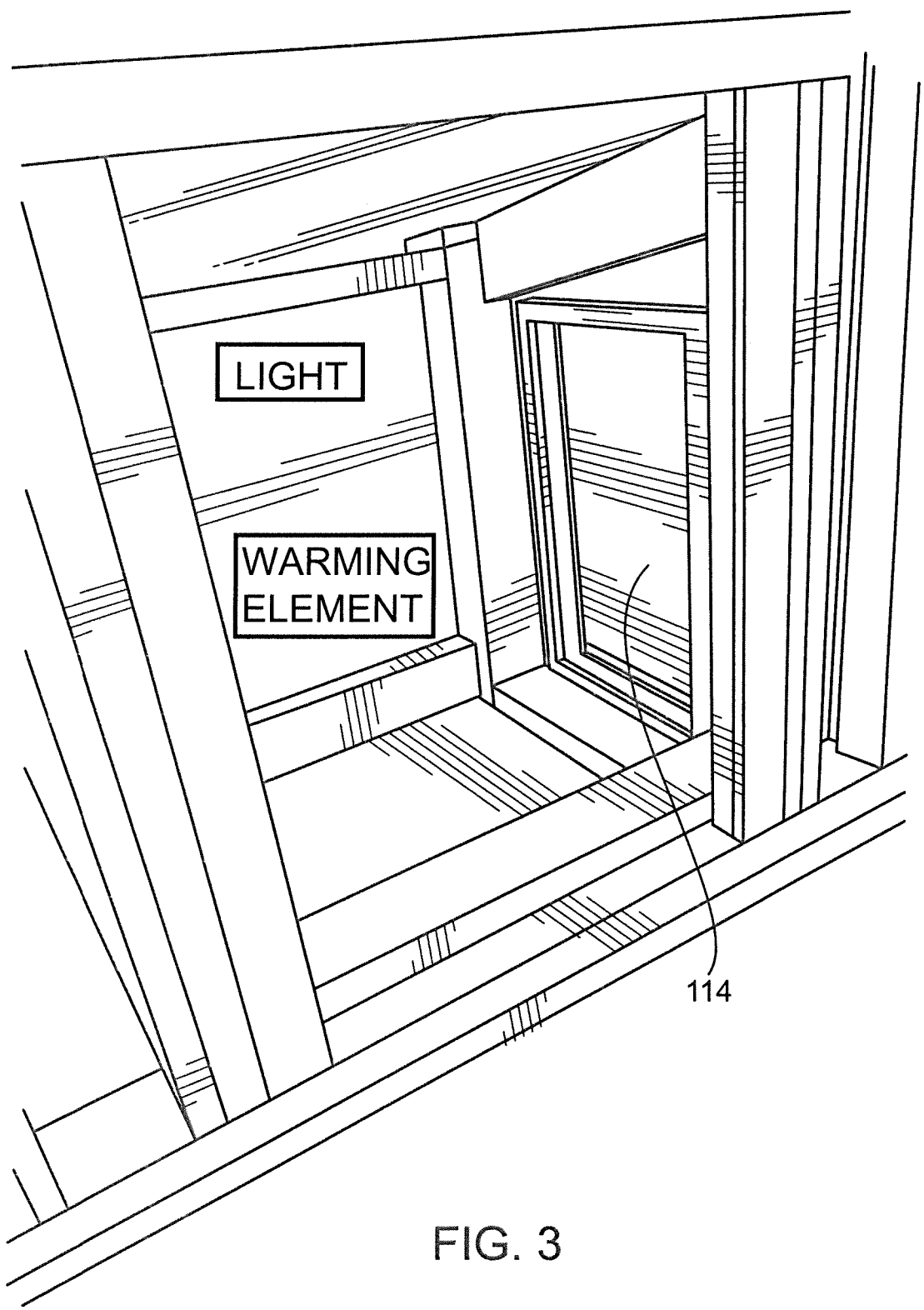
FIG. 3 depicts a rear view of the embodiment of FIG. 1.

Generally, the depicted vestibule (101) is not attached to the door (103). That is, the vestibule (101) is disposed snugly adjacent to the door (103), but not attached to the door (103), so that if the door (103) is opened, the vestibule (101) remains in place. This can be seen in FIG. 3. In effect, the door (103), when closed, comprises the fourth enclosed wall or side for the open end (107). This allows the door (103) to be used for human ingress/egress, as the human can step past, around, or over the vestibule (101). The dimensions and shape of the vestibule (101) may vary from a rectangular prism to accommodate structures associated with the door (103), such as the jambs and/or threshold.

In a further embodiment, the vestibule (101) may comprise lockable casters, rollers or other movement means so that it (101) can be rolled away from the door (103) to improve the ease of human ingress/egress, and then easily moved back into place. This also has the advantage of elevating the bottom of the vestibule (101) off the surface so it (101) does not react with the surface, which may cause rotting, deterioration, and/or discoloration. In such an embodiment, the bottom ends of the sides (110) and/or (107) may also comprise a sealing means, such as a door sweep, to inhibit water from entering the vestibule (101) from the gap caused by the casters or rollers.

The depicted vestibule (101) is constructed using a wood-frame structure, but other materials and construction techniques are possible as well within the scope and spirit of this disclosure. For example, the top (113) may be shingled and the sides may be sided to match the overall exterior appearance of the home, making the vestibule (101) appear more attractive and "built-in."

In a still further alternative embodiment the vestibule (101) may be attached to and supported by the door (103) such that when the door (103) opens, the vestibule (101) swings with it. In such an embodiment, the vestibule (101) is sized and shaped to pass through the door (103) opening through the angle. This generally comprises a right triangular configuration.

The vestibule (101) may further comprise other elements, such as interior lighting, warming elements, and/or drying elements. For example, in the depicted embodiment, the vestibule (101) has an open bottom with no separate floor, meaning the animal steps into the vestibule (101) and its paws rest on the decking material or other ground material beneath the vestibule (101). However, in an alternative embodiment, a separate vestibule (101) floor may be included, which may comprise a material or texture for drying or cleaning animal paws, which are known in the art. Such flooring material may be removable for easy replacing or washing.

Figure 5:
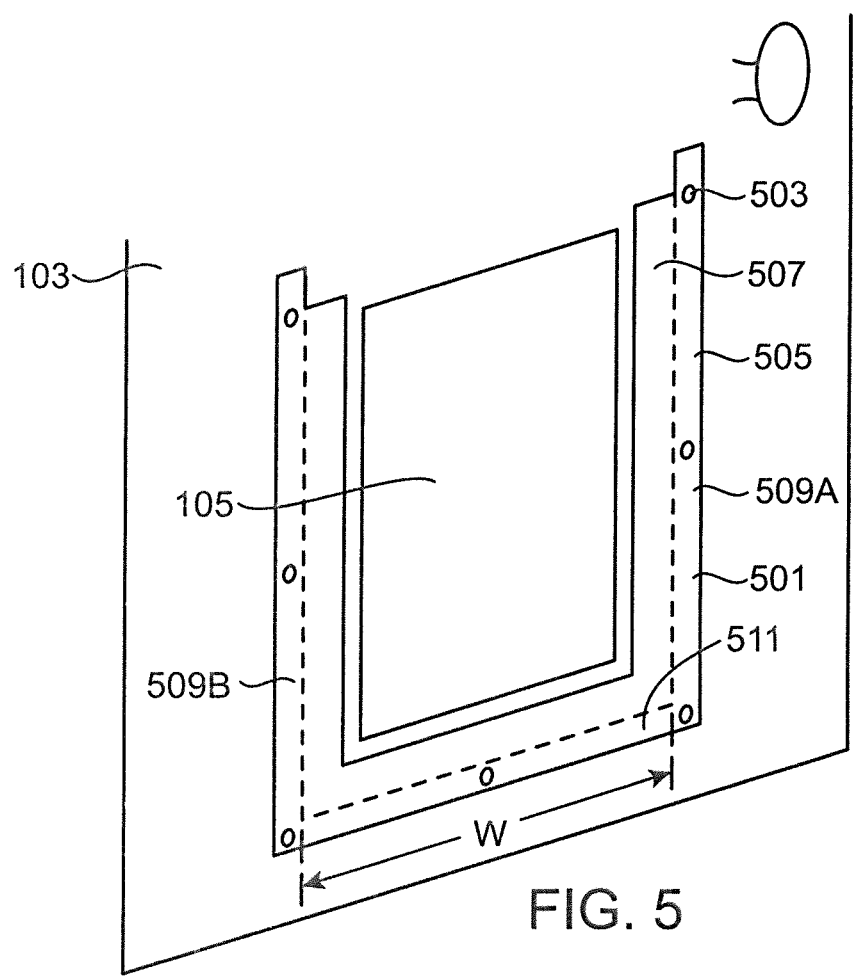
FIG. 5 depicts an embodiment of a temporary mounting system for a pet vestibule according to the present disclosure.
Figure 6:
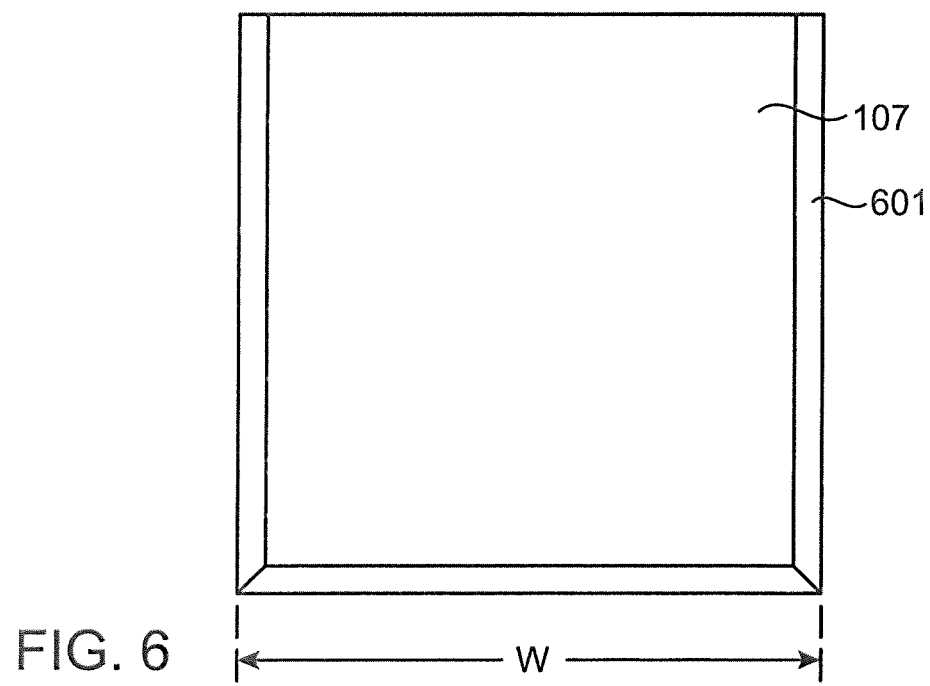
FIG. 6 depicts a front elevation view of an embodiment of a temporary mounting system for a pet vestibule according to the present disclosure.

In many installations, it may be desirable to be able to quickly attach or remove the vestibule (101) from a door. For example, the vestibule (101) or door require repair, replacement, or cleaning, these tasks are generally simpler if the vestibule can be removed. FIGS. 5 and 6 depict an embodiment of a temporary installation system for a pet vestibule (101) according to the present disclosure. In the depicted embodiments of FIGS. 5 and 6, the open side (107) of the pet vestibule (101) is attached to the door (103) using a tongue-in-groove system. A generally U-shaped frame (501) is attached to the side of the door (103) to which the vestibule (101) is to be installed. This may be done using any attaching technique known in the art. In the depicted embodiment, the frame (501) has a plurality of holes at various points through which a hardware fastener (503) may be inserted to hold the frame (501) against the door (103). Nails, screws, bolts, and other fasteners may be used. Generally, weather-resistant components are desirable, and the connection may be further reinforced with weatherproofing, such as by use of a silicone sealant.

The frame (501) is generally U-shaped, having two lateral arms (509A) and (509B), both generally linear elements, disposed vertically from, and generally perpendicularly to, a generally linear base (511). Each of the arms and base (509A), (509B) and (511) are comprised of an attaching portion (505) and a flange portion (507). The attaching portion (505) is disposed to the outside of the flange portion (507), and contains the holes (503) used to attach the frame (501) to the door (103). Thus, the flange portion (507) forms an interior U-shaped structure slightly smaller than the U-shape of the attaching portion (505). Whereas the attaching portion (505) is generally planar and attaches flush against the door (103), the flange portion (507) is configured to be disposed a small distance away from the door (103), or to be bendable and flexible so that the flange portion (507) can be bent away from the door (103) to allow a corresponding flange element (601) of the vestibule (101) to be inserted between the door (103) and flange portion (507), as described elsewhere herein. The width w of the flange element (601) that can be fitted into the U-frame (501) is generally defined by the lateral distance between the outside edges of the flange portions (507) of the arms (509A) and (509B).

Generally, the U-shaped frame (501) is installed to surround the pet door (105) on three sides, with the base (511) disposed below the pet door (105) and the arms (509A) and (509B) extending upward on either side of the pet door (105). This is so that when the vestibule (101) is installed, as described elsewhere herein, the pet door (105) will lead to the interior of the vestibule (101). Thus, the dimensions of the U-frame (501) will depend on the size of the pet door (105). In an embodiment, the width w is twenty-four inches.

Correspondingly, the vestibule (101) may be configured with a flange element (601) configured and disposed on the vestibule (101) so as to interconnect and interlock with the flange portion (507) of the U-frame. In FIG. 6, a logical diagram of the open side (107) of the vestibule is shown, with a U-shaped flange element (601) disposed on the lateral sides and bottom. This flange element (601) is sized and shaped so that when the vestibule is attached to the door, the lateral sides of the U-shape flange element (601) slide between the flange portion (507) of the arms (509A) and (509B) and the bottom of the U-shaped flange element (601) slides into the flange portion (507) of the bottom (511) of the U-frame (501). Gravity then holds the vestibule (101) in place. The width and thickness of the flange element (601) is generally designed to coordinate with the configuration of the flange portion (507) of the U-frame (501). Thus, the lateral width w between the outside edges of the lateral arms of the U-shaped flange element (601) is about the same as the lateral width w of the flange portion (507).

It will be understood by one of ordinary skill that the open side (107), though open to allow passage of an animal therethrough, still comprises structural and framing elements to which the flange element (601) can be attached.

In an embodiment, it may be desirable to provide additional support for the vestibule (101) to reduce the stress on the door (103). Because the vestibule (101) is attached to the door and otherwise "floats" over the ground, the strain of the vestibule's weight is carried by the door (103). To reduce this strain, which over a period of time could result in door failure, legs and/or feet may be attached to the vestibule (101) to provide a distal point of ground support, reducing the force on the door (103).

Figure 7:
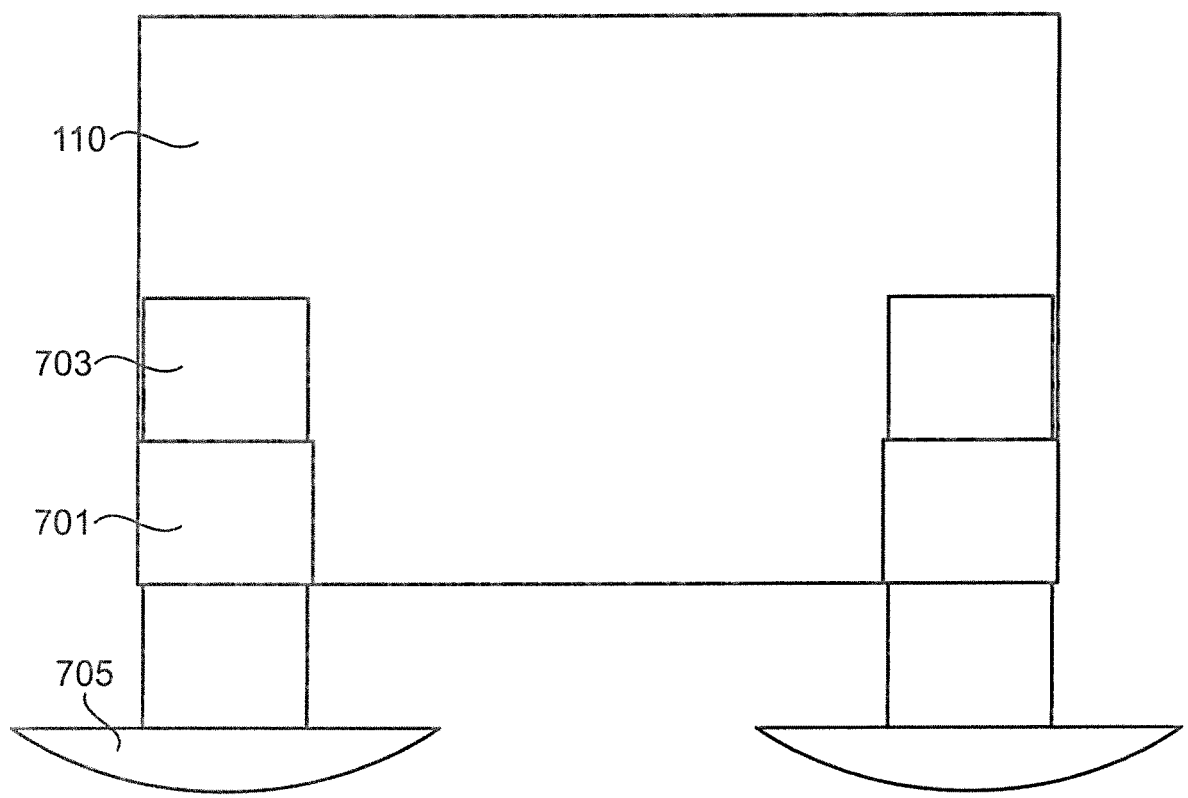
FIG. 7 depicts a diagram of an embodiment of adjustable support legs for a pet vestibule according to the present disclosure.
Figure 8:
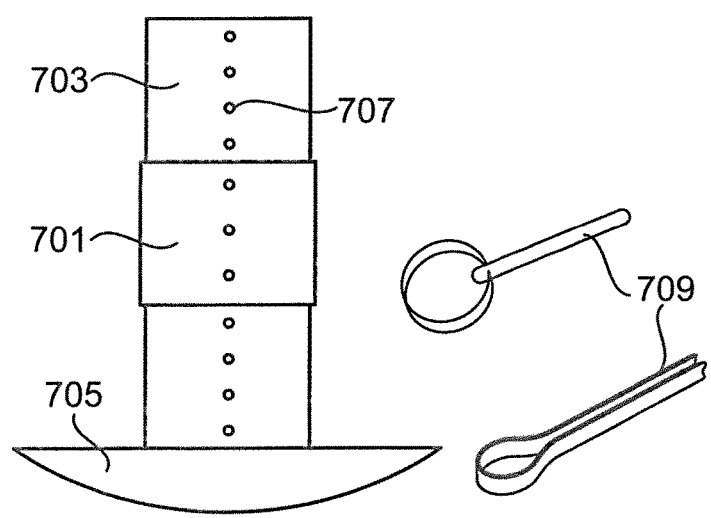
FIG. 8 depicts a diagram of an embodiment of adjustable support legs for a pet vestibule according to the present disclosure.

FIGS. 7 and 8 depict an embodiment of such a leg/foot structure. In the depicted embodiment of FIG. 7, the side (110) of the box (109) opposite the open end (i.e., the side (110) disposed most distal from the point of attachment to the door (103)) comprise a leg (703) assembly. The depicted leg (703) assembly comprises a sleeve (701) generally in the configuration of a hollow cube or rectangular prism, attached to the vestibule (101) so that the open sleeve (701) is disposed vertically to the pull of gravity. A leg (703) is inserted through the sleeve (701). The depicted leg (703) is generally a rectangular post, sized and shaped to be snugly, but movably inserted into the sleeve (701). The leg (703) is preferably long enough to pass through the sleeve (701) and touch the ground at one end, while also having at least some length of the leg (703) extending from the top of the sleeve (701) at the opposing end. This provides more stability and reduces stress and breakage.

The bottom of the depicted leg (703) terminates in a foot (705) component disposed between the leg (703) and ground. This foot (705) component is generally a low-friction component, as it will slide over the decking, ground or other material outside the door (103) when the door (103) is opened. The depicted foot (705) has a rounded shape to reduce the amount of material of the foot (705) contacting the ground/floor, and may be made of a soft or low-friction material. In the depicted embodiment of FIG. 7, two such leg and sleeve assemblies are shown, but in an embodiment, the vestibule (101) may comprise one, two, three, or more such assemblies. The assembly may be attached to the interior or exterior of the side (110), and may also, or alternatively, be attached to other sides (110) of the vestibule (101) in an embodiment.

FIG. 8 depicts an adjustable leg assembly. The depicted adjustable leg assembly has generally the same components as that described with reference to FIG. 7, except that the sleeve (701) and leg (703) each have a series of vertically aligned holes (707). The holes (707) are disposed on the sleeve (701) and leg (703) in coordinating positions such that a fastener (709) inserted through a hole in the sleeve (701) may also be inserted into a hole (707) in the leg. The height of the leg (707) can be adjusted by sliding the leg (707) to the desired height and inserting a fastener (709) through the aligned holes of the sleeve (701) and leg (707) to hold the leg in place. Any appropriate fastener may be used, but two exemplary fasteners (709) are depicted in FIG. 8, namely, a quick-release pin with a finger ring, and a cotter pin.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A pet vestibule comprising:
   a residential house door having a pet door therein;
   an open side attached to said residential house door such that the perimeter of said open side is generally flush to said residential house door and said perimeter surrounds said pet door;
   a wall side opposing said open side and generally parallel thereto;
   a vestibule door side extending from said open side to said wall side, said vestibule door side comprising a wall with an opening therein configured to accommodate the passage of an animal and forming a vestibule pet door;
   a second wall side opposing said door side and extending from said open side to said wall side; and
   a top side connected to said open side, said wall side, said door side, and said second wall side;
   a bottom floor side opposing said top side;
   a plurality of wheels attached to said vestibule such that said vestibule rolls on said wheels;
   wherein said open side, said wall side, said door side, said second wall side, and said top side are attached in the configuration of a right trapezoidal prism.

2. The vestibule of claim 1, wherein said top side is translucent.

3. The vestibule of claim 1, wherein said top side is transparent.

4. The vestibule of claim 1, wherein said top side slopes downwardly away from said residential door.

5. The vestibule of claim 1, wherein said top side extends outwardly from said door side, said wall side, and second wall side.

6. The vestibule of claim 1, further comprising a sealing means for inhibiting rain runoff from a door from entering the vestibule.

7. The vestibule of claim 6, wherein said sealing means is selected from the group consisting of: a gasket and a door sweep.

8. The vestibule of claim 1, further comprising an interior electrical light.

9. The vestibule of claim 1, further comprising an interior warming element.

10. The vestibule of claim 1, further comprising one or more height-adjustable leg assemblies.

* * * * *